United States Patent
Ohara

(10) Patent No.: US 8,534,336 B2
(45) Date of Patent: Sep. 17, 2013

(54) PNEUMATIC TIRE

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 320 days.

(21) Appl. No.: 12/774,745

(22) Filed: May 6, 2010

(65) Prior Publication Data

US 2010/0288409 A1 Nov. 18, 2010

(30) Foreign Application Priority Data

May 18, 2009 (JP) ................. 2009-120275

(51) Int. Cl.
*B60C 13/00* (2006.01)
*B60C 13/02* (2006.01)

(52) U.S. Cl.
USPC ........................................ 152/523

(58) Field of Classification Search
None
See application file for complete search history.

(56) References Cited

U.S. PATENT DOCUMENTS

| | | | |
|---|---|---|---|
| 6,460,584 B1 | 10/2002 | de Labareyre | |
| D563,311 S * | 3/2008 | Brainerd et al. | D12/605 |
| 2010/0000648 A1* | 1/2010 | Nakano | 152/523 |
| 2010/0193101 A1 | 8/2010 | Miyasaka et al. | |

FOREIGN PATENT DOCUMENTS

| | | | |
|---|---|---|---|
| EP | 320143 A2 | | 6/1989 |
| EP | 1 834 812 | | 9/2007 |
| EP | 1 953 009 | | 8/2008 |
| EP | 2055507 | * | 5/2013 |
| JP | 1145206 U | | 6/1989 |
| JP | 05-96649 | | 4/1993 |
| JP | 11-291718 | | 10/1999 |
| JP | 2000-318410 | | 11/2000 |
| JP | 2004-291936 | | 10/2004 |
| JP | 2004291937 A | | 10/2004 |
| JP | 2004291938 A | | 10/2004 |
| JP | 2006-290240 | * | 10/2006 |
| JP | 3922978 | | 3/2007 |
| JP | 3943359 | | 4/2007 |
| JP | 2007-245945 | | 9/2007 |
| JP | 2009-29384 | * | 2/2009 |
| WO | WO2009017166 A1 | | 2/2009 |

OTHER PUBLICATIONS

Japanese Office Action for Appln No. 2009-120275, 3 pages.

* cited by examiner

*Primary Examiner* — Justin Fischer
(74) *Attorney, Agent, or Firm* — Fish & Richardson P.C.

(57) ABSTRACT

A pneumatic tire has a pair of bead portions, side wall portions extending to an outer side in a tire diametrical direction from the bead portions, and a tread portion connected to an outer end in a tire diametrical direction of each of the side wall portions. An outer wall surface of the side wall portion is provided with a circumferential projection annularly extending along a tire circumferential direction, and a plurality of diametrical projections extending to an inner side in a tire diametrical direction from the circumferential projection and arranged so as to be spaced in the tire circumferential direction. A gap portion formed between the diametrical projections is open to an inner side in the tire diametrical direction.

8 Claims, 4 Drawing Sheets

PNEUMATIC TIRE

BACKGROUND OF THE INVENTION

1. Field of the Invention

The present invention relates to a pneumatic tire aiming at driving on a punishing road including a rocky stretch and a muddy terrain.

2. Description of the Related Art

In an off-road pneumatic tire aiming at a punishing road driving, it is necessary to take into consideration not only driving on a flat paved road or unpaved road, but also driving on a rough punishing road including a muddy terrain. Accordingly, there has been known a tire structured such that a projection is provided in a buttress portion which is not grounded at a normal driving time on the flat paved road, and a traction can be generated by a shearing resistance of the projection in the case of sinking into the muddy terrain (for example, Japanese Unexamined Patent Publication No. 11-291718). Further, there has been known a fact that an external scratch resistance at a time of driving on the punishing road is improved by such a projection (for example, Japanese Unexamined Patent Publication No. 2004-291936).

Incidentally, there is a case that a rocky stretch such as a rugged mountain or the like is included in addition to the muddy terrain, in a driving course of an off-road race. In the rocky stretch, as shown in FIG. 6, there is a condition that it is necessary to drive by grounding only an end portion of a tread surface Tr, and there is a case that a wheel falls out of a rock R in some cases. Generally, a cross sectional width CW of the tire is larger than a tread width TW, and if the tire falls, an outer wall surface 20a of a side wall portion 20 is scuffed and applied to the rock R so as to be greatly deformed to an inner side in a width direction. At this time, there is a case that a load is concentrated on a specific position of the side wall portion 20 so as to damage.

In Japanese Patent No. 3922978, there is described a pneumatic tire in which a convex protector having an elastic reinforcing member built-in is formed in a tire circumferential direction, thereby protecting a side wall portion. However, the protector is only structured such as to protect the side wall portion from an obstacle coming close mainly along a tire axial direction or a tire circumferential direction, and cannot prevent the side wall portion from being damaged with respect to an external scratch factor (for example, an edge portion of a road surface and an angular portion of a rock surface) coming into contact along a tire diametrical direction at a time when the wheel falls.

In other words, in a case where the above-mentioned tire falls, the external scratch factor coming close along the tire diametrical direction may be received by the protector, however, the protector locally deforms in the tire diametrical direction at the received part, and a strain is concentrated on a root so as to easily generate a cut scratch. Since the cut scratch is generated in a center portion in a tire cross section height in which a thickness is comparatively small, the cut scratch tends to cause a cut puncture, and is directly linked to a shortening of a tire service life. In the punishing road drive, it is often the case that the tire is under an environment that it cannot be exchanged, and it is desired to focus on devising a countermeasure against an instantaneous tire function loss such as the cut puncture.

In Japanese Unexamined Patent Publication Nos. 2000-318410 and 2007-245945, there is described a tire in which a flap-shaped projection piece is provided in an outer wall surface of a side wall portion for preventing a water splash from flying at a time of driving in a rainy weather. Further, in Japanese Unexamined Patent Publication No. 5-96649, there is described a tire in which a convex stripe is provided in the vicinity of a mold split surface for preventing an overflow rubber (a burr) formed in the mold split surface from being generated at a time of manufacturing the tire. However, such a projection piece and convex stripe neither be structured such as to protect the side wall portion from the external scratch factor, nor be capable of improving a damage resistance at a time when the wheel falls as mentioned above.

In Japanese Patent No. 3943359, there is described a pneumatic tire in which a protector protruding from an outer wall surface of a side wall portion is provided with an outer annular portion being annularly continuous in a tire circumferential direction, an inner annular portion being annularly continuous in an inner side in a tire diametrical direction thereof, and a concave portion formed by depressing a surface of the protector while leaving a joint portion joining between these pair of annular portions. However, there has been known that there is great fear of causing a damage of the side wall portion due to the structure of the protector at a time when the wheel falls as mentioned above.

In other words, when the above tire falls, there is a case that an inner annular portion 22 which is closer to the center portion of the tire cross section height than an outer annular portion 21 catches on a rock R, as shown in FIG. 7, and there is a risk that a stress is concentrated on a root of the inner annular portion 22 and a puncture is generated by a cut scratch. Accordingly, it is necessary to avoid arranging an element on which the external scratch factor catches in the tire diametrical direction, in the vicinity of the center portion of the tire cross section height in which a thickness is comparatively small, and it is further necessary to keep the outer wall surface of the side wall portion away from the external scratch factor.

Further, since a concave portion 23 is surrounded by the outer annular portion 21 and the inner annular portion 22, in the tire mentioned above, there is a problem that a muddy soil is hard to be discharged from the concave portion 23 at a time of driving on the muddy terrain. Accordingly, in the muddy terrain, a rotational resistance of the tire is increased by the muddy soil clogged in the concave portion 23, and a traction caused by a joint portion is not achieved due to a flattening of the surface of the protector, so that it is unavoidable to deteriorate a punishing road driving performance.

SUMMARY OF THE INVENTION

The present invention has been made in view of the above circumstances, and an object of the present invention is to provide a pneumatic tire structured such that a damage resistance at a time when a wheel falls can be improved, while securing a punishing road driving performance in a muddy terrain.

Means for Solving the Problem

The object can be achieved by the following present invention. That is, the present invention provides a pneumatic tire comprising a pair of bead portions, side wall portions extending to an outer side in a tire diametrical direction from the bead portions, and a tread portion connected to an outer end in a tire diametrical direction of each of the side wall portions, wherein an outer wall surface of the side wall portion is provided with a circumferential projection annularly extending along a tire circumferential direction, and a plurality of diametrical projections extending to an inner side in a tire diametrical direction from the circumferential projection and arranged so as to be spaced in the tire circumferential direction, and a gap portion formed between the diametrical projections is open to an inner side in the tire diametrical direction.

According to the pneumatic tire, it is possible to receive the external scratch factor coming close along a tire diametrical direction by the circumferential projection, for example, at a time when the wheel falls during the drive on the rocky stretch, and it is possible to suppress a deformation of the circumferential projection at the received part by the diametrical projection. In other words, when the wheel falls, the circumferential projection comes to a shelf receiving the external scratch factor, the diametrical projection comes to a column support reinforcing the shelf, and it is possible to rigidly support the external force of the road surface so as to prevent the cut scratch from being generated, in accordance with a cooperation of both the projections. Further, even though the wheel falls further from the state in which the circumferential projection receives the external scratch factor, it does not catch on the external scratch factor in the vicinity of the center portion of the tire cross section height since the gap portion formed between the diametrical projections is open to the inner side in the tire diametrical direction, and it is possible to keep the external scratch factor away from the outer wall surface of the side wall portion by the diametrical projection all the same time.

On the other hand, in the drive on the muddy terrain, a ground surface pressure is lowered by the circumferential projection which is reinforced by the diametrical projection, and it is possible to enhance a floatation performance of the tire so as to suppress a sinking. In other words, in the muddy terrain, the same effect as the case that the tread portion widen the width can be obtained in a pseudo manner by both the projections. Since it is possible to achieve the traction by the diametrical projection while suppressing the sinking of the tire as mentioned above, and the gap portion is open to the inner side in the tire diametrical direction, the muddy soil is easily discharged from the gap portion. As mentioned above, in accordance with the pneumatic tire of the present invention, it is possible to improve a damage resistance at a time when the wheel falls, while securing the punishing road driving performance in the muddy terrain.

In the present invention, it is preferable that an upper end surface of the circumferential projection is positioned within a range between 20 and 40 mm in an inner side in the tire diametrical direction from a position of an outermost diameter of the tire, whereby it is possible to well improve the damage resistance at a time when the wheel falls. In other words, it is possible to prevent a shock at a time when the circumferential projection receives the external scratch factor from becoming excessively large, by arranging the upper end surface of the circumferential projection within 40 mm from the position of the outermost diameter of the tire. Further, it is possible to prevent the deformation of the side wall portion from becoming excessively large, at a time when the wheel falls further from the state in which the circumferential projection receives the external scratch factor, by keeping the upper end surface of the circumferential projection away 20 mm or more from the position of the outermost diameter of the tire. Further, there can be obtained an effect of covering the fall of wheel, by arranging the upper end surface of the circumferential projection within the range mentioned above. Accordingly, it is possible to again return the tread surface onto the driving road surface by a slight operation of a steering wheel, even in the case of deviating from the driving road surface. In the case that the upper end surface of the circumferential projection is arranged beyond 40 mm from the position of the outermost diameter, the side wall of the rock or the like bites into the tire, and it becomes hard to return onto the original driving road surface.

In the present invention, it is preferable that a projection height of the circumferential projection is equal to or more than 5 mm. Accordingly, the external scratch factor can be easily received by the circumferential projection at a time when the wheel falls, and it is easy to obtain an effect of improving a floatation performance which is sufficient for suppressing the sinking of the tire in the muddy terrain.

In the present invention, it is preferable that a cross sectional shape in a cross section of a tire meridian of the circumferential projection is formed as a mountain shape having a flat upper end surface, and a contact length with an outer wall surface of the side wall portion is equal to or more than a projection height. According to the structure mentioned above, since a rigidity of the circumferential projection with respect to the input in the tire diametrical direction is enhanced, it is possible to firmly receive the external scratch factor at a time when the wheel falls, and it is possible to suppress the local deformation. As a result, it is possible to prevent the cut scratch from being generated in the circumferential projection so as to enhance the damage resistance.

In the present invention, it is preferable that a plurality of diametrical projections have a plurality of projection heights. Since the muddy soil entering into the gap portion can be easily discharged by varying the projection height of the diametrical projection, and it is possible to efficiently achieve the traction by the diametrical projection, it is possible to improve the punishing road driving performance in the muddy terrain.

In the present invention, it is preferable that a distance in the tire circumferential direction of the diametrical projections is set to be equal to or less than a width of the diametrical projection. Accordingly, it is possible to inhibit the external scratch factor coming into contact along the tire diametrical direction from making an intrusion into the gap portion at a time when the wheel falls, and it is possible to preferably secure the damage resistance of the side wall portion.

In the present invention, it is preferable that the diametrical projections are coupled to the circumferential projection so as to substantially adjust a projection height from the inner side in the tire diametrical direction. According to the structure mentioned above, since the upper end surface of the portion at which the diametrical projection is coupled to the circumferential projection becomes flat, it is possible to easily pluck away the overflow rubber formed at a time of manufacturing the tire so as to easily remove, even in the case that the mold split surface is set in the vicinity of the portion.

In the present invention, it is preferable to further comprise an auxiliary projection extending to an outer side in the tire diametrical direction from the circumferential projection. Accordingly, since the traction by the auxiliary projection can be achieved in the driving on the muddy terrain, the punishing road driving performance can be enhanced.

DETAILED DESCRIPTION OF THE PREFERRED EMBODIMENTS

Figure 1:
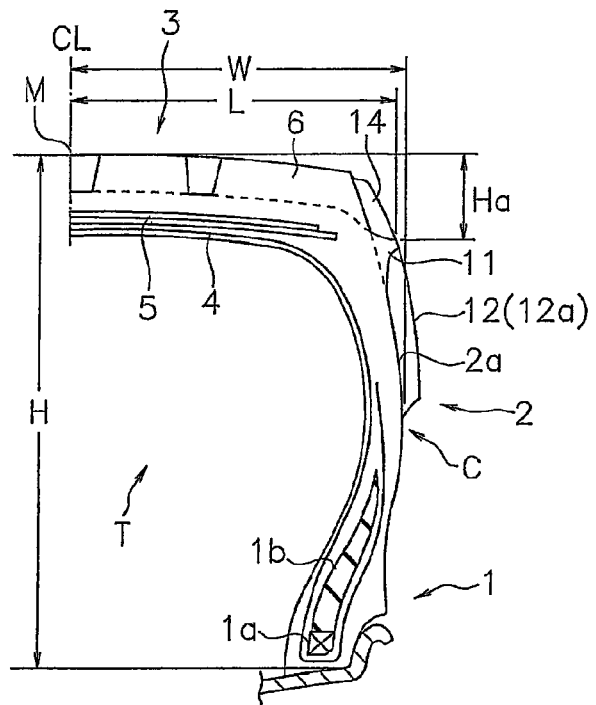
FIG. 1 is a sectional view of a tire meridian showing one example of a pneumatic tire according to the present invention.
Figure 2:
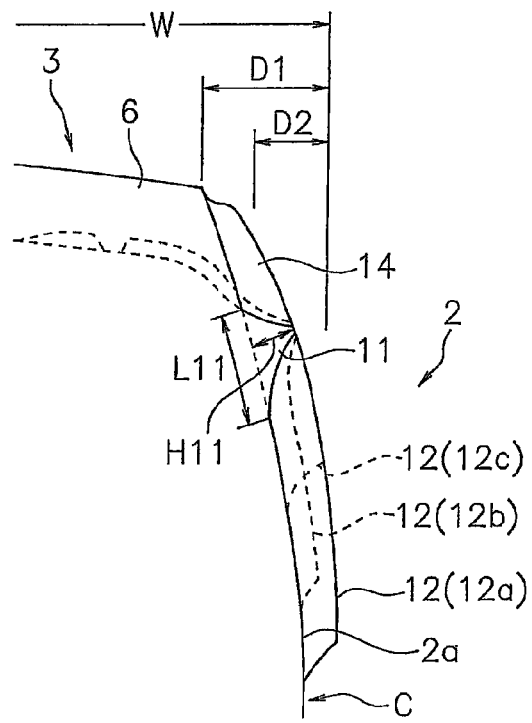
FIG. 2 is a cross sectional view showing an outer profile shape of a substantial part of the pneumatic tire in an enlarged manner.
Figure 3:
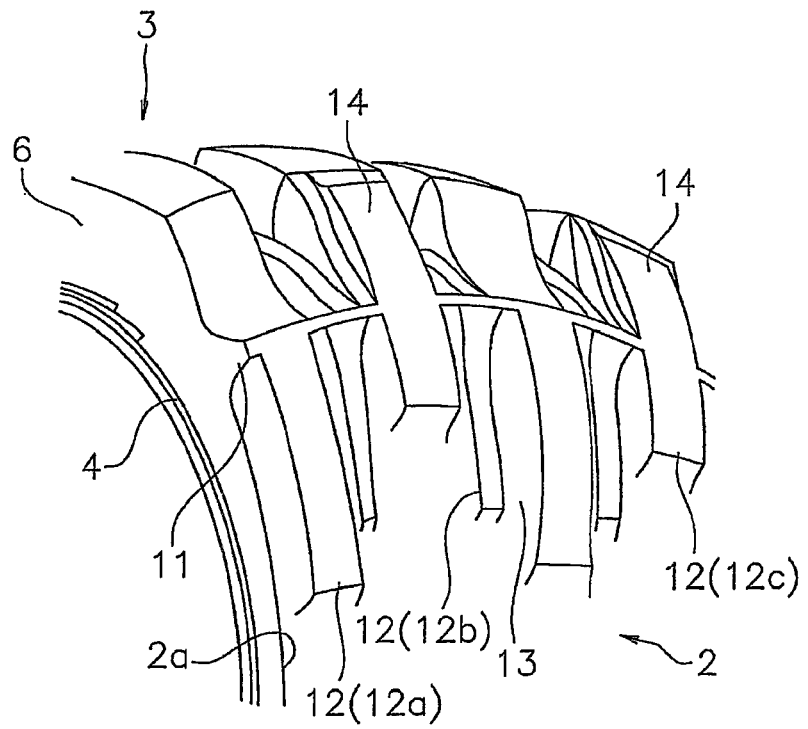
FIG. 3 is a perspective cross sectional view showing a substantial part of the pneumatic tire in an enlarged manner.

An embodiment of the present invention will be explained with reference to the drawings. FIG. 1 is a sectional view of a tire meridian showing one example of a pneumatic tire according to the present invention, and shows only right side half. FIG. 2 is a cross sectional view showing an outer profile shape of a substantial part of the pneumatic tire in an enlarged manner. FIG. 3 is a perspective cross sectional view showing a substantial part of the pneumatic tire in an enlarged manner.

A pneumatic tire T is a pneumatic radial tire for off road aiming at driving on a punishing road including a rocky stretch and a muddy terrain, and is provided with a pair of bead portions 1, side wall portions 2 extending to an outer side in a tire diametrical direction from the bead portions 1, and a tread portion 3 connected to an outer end in the tire diametrical direction of each of the side wall portions 2. The bead portion 1 is provided with an annular bead core 1a and a bead filler 1b, and an end portion of a toroidal carcass 4 arranged between a pair of bead portions 1 is folded back via the bead core 1a.

A belt 5 constructed by two plies laminated inside and outside is laminated in an outer periphery of the carcass 4 of the tread portion 3, and a tread rubber 6 is provided further in an outer periphery thereof. A surface of the tread rubber 6 is provided with a main groove extending along a tire circumferential direction, and a lateral groove extending while intersecting the main groove, and a tread pattern is formed in accordance with a demanded tire performance and use condition. The tread pattern of the pneumatic tire of the present invention is not particularly limited.

An outer wall surface 2a of the side wall portion 2 is provided with a circumferential projection 11 annularly extending along a tire circumferential direction, and a plurality of diametrical projections 12 extending to an inner side in a tire diametrical direction from the circumferential projection 11 and arranged so as to be spaced in the tire circumferential direction, and a gap portion 13 is formed as a groove shape between the diametrical projections 12. The gap portion 13 is formed in a shape such that an outer side in the tire diametrical direction is closed by the circumferential projection 11, and an inner side in the tire diametrical direction is opened. The projections 11 and 12 are provided in a protruding manner in an outer wall surface 2a of at least one side wall portion 2, however, it is preferable that the projections 11 and 12 are provided in a protruding manner in both the side wall portions 2, in the light of enhancing a damage resistance at a time when a wheel falls and a punishing road driving performance in a muddy terrain.

The circumferential projection 11 is provided in a so-called buttress portion. The buttress portion is a portion in an outer side in the tire diametrical direction of the side wall portion 2, and is a portion which does not ground at a time of normally driving on a flat paved road. In a soft road such as the muddy terrain, since the tire T sinks due to a weight of the vehicle, the buttress portion sinking into the muddy soil comes about grounding in a pseudo manner.

Figure 4:
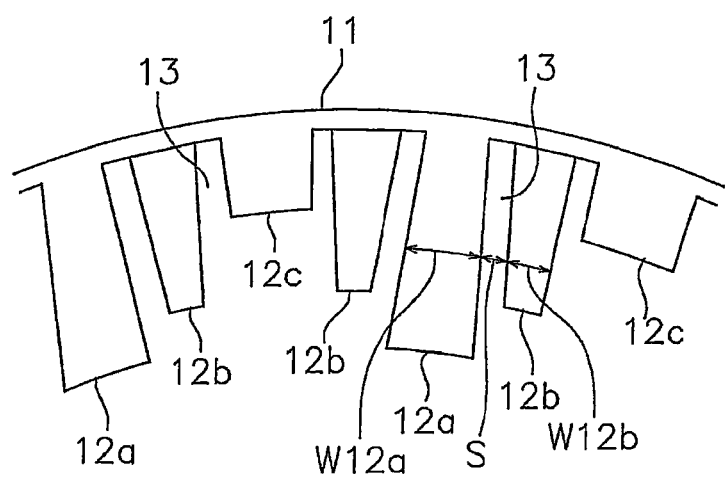
FIG. 4 is a schematic view at a time of seeing a circumferential projection and a diametrical projection from a tire axial direction.

FIG. 4 is a schematic view at a time of seeing a circumferential projection 11 and a diametrical projection 12 from a tire axial direction. In the present embodiment, three kinds of projections 12a to 12c having different sizes and shapes are provided as the diametrical projection 12, and are called as "diametrical projection 12" collectively in the following description. The diametrical projection 12 extends in a direction intersecting the circumferential projection 11, and is coupled to the circumferential projection 11 from an inner side in the tire diametrical direction. When the wheel falls, the circumferential projection 11 comes to a shelf receiving an external scratch factor, and the diametrical projection 12 serves as a column support reinforcing the shelf.

Figure 5:
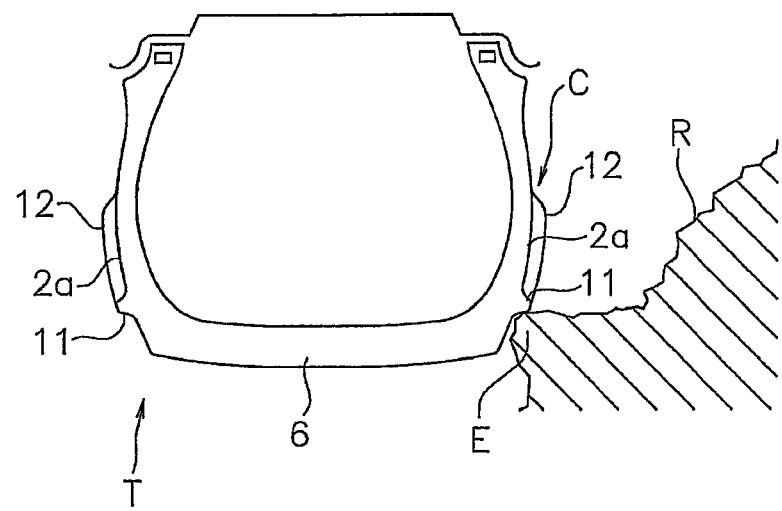
FIG. 5 is a cross sectional view showing a condition at a time when the tire in accordance with the present invention falls.
Figure 6:
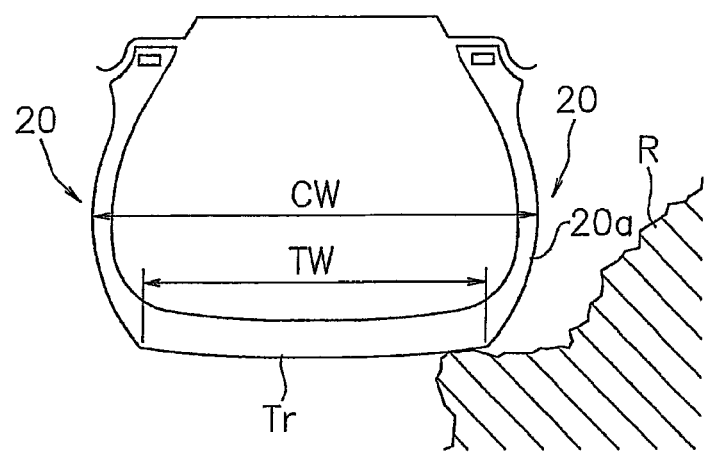
FIG. 6 is a cross sectional view showing a condition of driving on a rocky stretch by a conventional tire.
Figure 7:
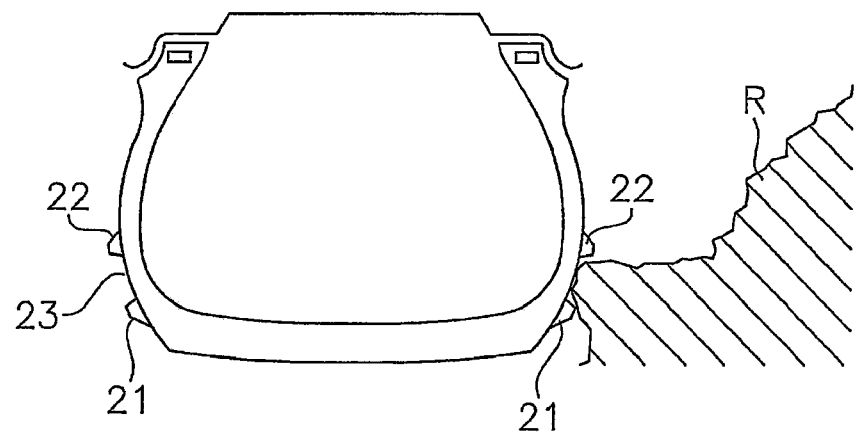
FIG. 7 is a cross sectional view showing a condition at a time when a conventional tire falls.

In the case where the tire T falls out of a rocky stretch, it is possible to receive an edge portion E of a road surface coming to the external scratch factor by the circumferential projection 11, as shown in FIG. 5. At this time, a great load is applied to the circumferential projection 11 from an outer side in the tire diametrical direction, however, since a plurality of diametrical projections 12 come to the column support so as to reinforce the circumferential projection 11, it is possible to firmly support an external force of the road surface so as to prevent the cut scratch. Further, if the wheel falls further from the state in FIG. 5, the edge portion E comes close to a center portion C of a tire cross sectional height H of the outer wall surface 2a, however, since the gap portion 13 is open to the inner side in the tire diametrical direction, the edge portion E does not catch on the tire diametrical direction in the vicinity of the center portion C, and it is possible to keep the edge portion E away from the outer wall surface 2a by the diametrical projection 12 all the same time.

If the wheel falls under a condition that such projections 11 and 12 are not provided, the edge portion E serving as the external scratch factor comes about coming close to the center portion C from the tread surface at a breath. In this case, since the side wall portion 2 is forced to deform to an inner side in a width direction corresponding to a distance D1 in the width direction at least from the tread end to the center portion C, a contact condition that the damage tends to be caused is generated. On the contrary, in accordance with the present invention, since the external scratch factor can be temporarily received by the circumferential projection 11, the deformation of the side wall portion 2 to the inner side in the width direction stays so as to correspond to a distance D2 in the width direction from the circumferential projection 11 to the center portion C, even in the case where the wheel falls further therefrom, so that the damage resistance can be enhanced by relaxing the contact condition.

In the muddy terrain, the tire T sinks by the weight of the vehicle as mentioned above, and the sinking buttress portion comes to a grounded state in a pseudo manner. In the pneumatic tire T, since the ground surface pressure is lowered by the circumferential projection 11 reinforced by the diametrical projection 12, it is possible to enhance a floatation characteristic of the tire so as to suppress the sinking. Further, since the diametrical projection 12 scrapes the muddy soil, whereby the traction is achieved, and the muddy soil is easily discharged from the gap portion 13, it is possible to maintain a shear resistance by the diametrical projection 12. As a result, it is possible to well secure the punishing road driving performance in the muddy terrain.

In the light of effectively improving the damage resistance at a time when the wheel falls, it is preferable that the upper end surface of the circumferential projection 11 is positioned in a range between 20 and 40 mm from the outermost diameter position of the tire T to the inner side in the tire diametrical direction. The position of the upper end surface is measured based on an outer edge in the tire diametrical direction of the upper end surface of the circumferential projection 11, that is, it is preferable that a cross sectional height Ha shown in FIG. 1 is between 20 and 40 mm. In the present embodiment, a tire outermost diameter point M corresponding to an outermost diameter position of the tire is positioned at an intersection between a tire equator line CL and the surface of the tread rubber 6, however the tire outermost diameter point M is not limited to the point on the tire equator line CL.

The preferable dimensional value mentioned above is structured such as to be measured under a normal state with no load in which the tire is installed to a normal rim and a normal internal pressure is charged. The normal rim is a rim which is determined per tire by a standard system including a standard on which the tire is based, for example, is a standard rim in JATMA, "Design Rim" in TRA, or "Measuring Rim" in ETRTO. Further, the normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO.

Further, it is preferable that the upper end surface of the circumferential projection 11 is positioned in a range in which the distance L in the tire width direction based on the tire equator line CL becomes equal to or more than 95% the tire cross sectional half width W. Accordingly, the circumferential projection 11 is moderately kept away from the tread surface, and it is possible to enhance an effectiveness of the function of receiving the external scratch factor when the wheel falls. A position of the upper end surface can be measured in the normal state mentioned above based on the outer edge in the tire diametrical direction.

A projection height H11 of the circumferential projection 11 is preferably equal to or more than 5 mm, more preferably goes beyond 5 mm, and is further preferably equal to or more than 8 mm. Accordingly, the external scratch factor tends to be received easily by the circumferential projection 11 when the wheel falls, and it is possible to effectively enhance the floatation characteristic of the tire in the muddy terrain. The projection height H11 is measured as a height in a normal line direction with respect to the outer wall surface 2a, that is, a height from the outer wall surface 2a to the upper end surface of the projection 11, as shown in FIG. 2. A projection height of the diametrical projection 12 mentioned below is measured in the same manner.

A cross sectional shape of the circumferential projection 11 shown in FIGS. 1 and 2 is formed as a mountain shape having a flat upper end surface, in more detail, formed as a composite volcano shape in which a slope is gently curved and pinched. Further, in the circumferential projection 11, a contact length L11 with the outer wall surface 2a is set to be equal to or more than the projection height H11. Accordingly, in comparison with the case that the cross sectional shape is formed as a simple triangle or trapezoid, it is possible to enhance a rigidity with respect to an input in the tire diametrical direction of the circumferential projection 11. As a result, the external scratch factor is firmly received by the circumferential projection 11 when the wheel falls, and the local deformation is easily suppressed.

The projections 12a to 12c constructing the diametrical projection 12 are arranged in such a manner that the projection 12a and the projection 12c are alternately interposed between the projections 12b while setting a distance in the tire circumferential direction, as shown in FIGS. 3 and 4. All the projections 12a to 12c extend to the inner side in the tire diametrical direction from the circumferential projection 11, however, the lengths are different from each other. In FIG. 2, the projections 12a to 12c are drawn in an overlapping manner while expressing the projection 12b and the projection 12c by a broken line.

Among the projections constructing the diametrical projection 12, the projection 12b has a smaller projection height than the other, and the diametrical projection 12 has a plurality of projection heights. Accordingly, it is easy to discharge the muddy soil entering into the gap portion 13, and it is possible to improve the punishing road driving performance in the muddy terrain by efficiently achieving the traction by the diametrical projection 12. Further, since the projections 12a to 12c are differentiated from each other in the length in the tire diametrical direction, and the diametrical projection 12 has a plurality of lengths, it is possible to enhance a muddy soil discharging performance of the gap portion 13 based on the structure mentioned above.

The projection height of the diametrical projection 12 is preferably equal to or more than 5 mm, more preferably goes beyond 5 mm, and is further preferably equal to or more than 8 mm. Accordingly, it is possible to firmly reinforce the circumferential projection 11 receiving the external scratch factor when the wheel falls, and in the muddy terrain, it is possible to easily achieve a traction which is sufficient for improving the punishing road driving performance, by securing the shearing resistance by the diametrical projection 12. In the present embodiment, the projection heights of all the projections 12a to 12c are set to be equal to or more than 5 mm. As mentioned below, the diametrical projection 12 includes a structure in which the projection height is changed along the tire diametrical direction, however, it is preferable that a value of the projection height in the portion coupled to the circumferential projection 11 is the above dimension in the case mentioned above.

Among the projections constructing the diametrical projection 12, the projection 12a which is the longest and has the great projection height is structured such that the projection height is progressively reduced toward the inner side in the tire diametrical direction. Specifically, there is exemplified a structure in which the projection height is set to 10 mm near the circumferential projection 11, and is set to 8 mm in the leading end of the inner side in the tire diametrical direction. Accordingly, it is possible to prevent the projection 12a from coming into contact with an obstacle such as a rock or the like during the drive, by suppressing the projection height in the vicinity of the center portion C having a great cross sectional width. Further, since the projection height of the inner side in the tire diametrical direction of the projection 12a is suppressed, even if it comes into contact, it is possible to suppress the generation of the crack in the root by dispersing the load over the whole of the projection.

The projection 12a extends to the vicinity of the center portion C of the tire cross sectional height H, and can enhance the damage resistance by accurately keeping the external scratch factor coming close to the outer wall surface 2a of the center portion C away, when the wheel falls further from the state in which the circumferential projection 11 receives the external scratch factor. It is preferable that the diametrical projection 12 includes the projection extending to the vicinity of the center portion C as mentioned above, and it is preferable that the cross sectional height to the leading end of the upper end surface of the projection based on the outermost diameter position of the tire is between 40 and 55% of the tire cross sectional height H.

As shown in FIG. 4, the distance in the tire circumferential direction of the diametrical projection 12 is set to be equal to or less than the width of the diametrical projection 12. Accordingly, it is possible to inhibit the external scratch factor coming into contact along the tire diametrical direction at a time when the wheel falls from making an intrusion into the gap portion 13 so as to more preferably secure the damage resistance. The distance of the diametrical projection 12 is the distance between the side surfaces in the root side of each of the projections, and the distance is equal to or less than the width of the projection having the side surface. In other words, in the present embodiment, the diametrical projection 12 has a plurality of widths, and includes the structure in which the width is changed along the tire diametrical direction, however, a distance S and the widths W12$a$ and W12$b$ which are adjacent on the same line extending in the tire circumferential direction satisfy a relationship S$\leq$W12$a$ and S$\leq$W12$b$.

Further, it is preferable that the distance of the diametrical projections 12 is set to be equal to or more than the projection height in comparison with the projection having the lower projection height among the projections forming the distance. In the above structure, since a width of the gap portion 13 becomes equal to or more than a depth thereof, and it is possible to secure a radius of curvature in the root side of the diametrical projection 12, it is easy to suppress the generation of the crack. Further, at a time of forming the gap portion 13 by pressing a frame portion of a mold to an outer wall surface of an uncured tire, since the frame portion becomes wider, the local deformation of the carcass 4 is suppressed, and this structure is preferable on manufacturing the tire. Taking into consideration a relationship between the distance and the width of the above diametrical projection 12, it is preferable that the width of the diametrical projection 12 is equal to or more than the projection height.

As shown in FIGS. 2 and 3, the diametrical projection 12 is coupled to the circumferential projection 11 from the inner side in the tire diametrical direction in a state in which the projection heights are substantially adjusted, and the upper end surface becomes flat in the portion in which the diametrical projection 12 is coupled to the circumferential projection 11. Accordingly, in the case where the mold split surface is set in the vicinity of the coupling portion, it is possible to easily remove the formed overflow rubber by plucking away. Among the projections constructing the diametrical projection 12, the projection 12$b$ having the small projection height is structured such that the projection height is increased toward the circumferential projection 11, and the projection height is set to be substantially the same in the portion coupled to the circumferential projection 11.

In the present embodiment, since the diametrical projection 12 extends in parallel to the tire diametrical direction, it is possible to efficiently and firmly reinforce the circumferential projection 11 along the tire diametrical direction. In order to secure the reinforcing effect mentioned above, it is preferable that an angle formed by the extending direction of the diametrical projection 12 and the tire diameter direction is equal to or less than 15 degrees. The extending direction of the diametrical projection 12 is defined based on the width center of the projection.

In the present embodiment, the diametrical projection 12 is constructed by three kinds of projections in which the sizes and the shapes are differentiated, however, the present invention is not limited to this, but the diametrical projection may be constructed by one, two, or four or more kinds of projections.

In the present embodiment, since the auxiliary projection 14 extending to the outer side in the tire diametrical direction from the circumferential projection 11 is provided, it is possible to achieve an excellent punishing road driving performance in addition to the traction generated by the auxiliary projection 14, in the driving on the muddy terrain. The auxiliary projection 14 is provided at the position corresponding to the projection 12$c$, and is structured such that an equivalent shearing resistance to the projection 12$a$ can be obtained by the projection 12$c$ and the auxiliary projection 14. It is preferable that the projection height of the auxiliary projection 14 based on the side surface of the tread rubber 6 is equal to or more than 5 mm for securing the traction.

The pneumatic tire in accordance with the present invention is the same as the normal pneumatic tire except that the circumferential projection and the diametrical projection as mentioned above is provided on the outer wall surface of the side wall portion, and the conventional known material, shape, structure, manufacturing method and the like can be applied to the present invention.

Since the pneumatic tire in accordance with the present invention is excellent in the damage resistance at a time when the wheel falls and the punishing road driving performance on the muddy terrain while having the operations and effects as mentioned above, it is useful as the off-road tire aiming the driving on the punishing road including the rocky stretch and the muddy terrain.

Example

An example tire which concretely shows the structure and effect of the present invention will be explained. An evaluation of each of performances is executed as follows.

(1) Damage Resistance at a Time when Wheel Falls

A test tire was installed to an actual car, a wheel was fallen at three times to an edge portion side by obliquely driving on an evaluation road provided with a lot of notches in the edge portion and formed as an inverted trapezoidal cross sectional shape, and a damage resistance at a time when the wheel fell was evaluated, by using a reciprocal of a summation of depth×length of the damage applied to the side wall portion as a rating scale. An evaluation is shown by an index number in the case of setting a comparative example 1 to 100, and indicates that the larger the numerical value is, the better the damage resistance is.

(2) Punishing Road Driving Performance on Muddy Terrain

The test tire was installed to the actual car, was driven by three test drivers in a region having different water contents peripherally on a circle road of a clayey road, a feeling evaluation was executed with regard to each of a driving (accelerating) performance, an easiness of course change, and a floatation characteristic, and a punishing road driving performance on the muddy terrain was comprehensively evaluated. An evaluation is shown by an index number in the case of setting a comparative example 1 to 100, and indicates that the larger the numerical value is, the better the punishing road driving performance is.

Comparative Examples 1 to 3 and Example 1

In an off-road pneumatic tire having a tire size LT315/75R16, a comparative example 1 was set to a tire which was not provided with none of a circumferential projection and a diametrical projection, and a comparative example 2 was set to a tire which was provided only with the circumferential projection and was not provided with the diametrical projection. Further, a comparative example 3 and an example 1 were set to a tire which was provided with both the circumferential projection and the diametrical projection, and in these, the comparative example 3 was provided additionally with a circumferential projection which annularly extends along a tire circumferential direction and was coupled to a leading end in an inner diameter side of the diametrical projection (the projection 12a mentioned above). Shapes of the projections are as shown in the embodiment mentioned above.

TABLE 1

|  |  | comparative example 1 | comparative example 2 | comparative example 3 | example |
|---|---|---|---|---|---|
| damage resistance |  | 100 | 300 | 180 | 500 |
| punishing road driving performance | synthesis | 100 | 120 | 127 | 193 |
|  | driving (accelerating) performance | 100 | 110 | 130 | 250 |
|  | course changing performance | 100 | 120 | 120 | 200 |
|  | Flotation | 100 | 130 | 130 | 130 |

As shown in Table 1, the example can achieve the excellent damage resistance and punishing road driving performance in comparison with each of the comparative examples. With regard to the damage resistance, superficial scratches were found widely in the side wall portion in the comparative example 2, a lot of deep scratches were found in the circumferential projection which was additionally provided in the inner diameter side in the comparative example 3, and the comparative example 3 had the scratch running into the carcass. On the contrary, in the example, there were scratches in the diametrical projection, however, any abraded scratch was not found in an outer wall surface of the side wall portion. Further, with regard to the punishing road driving performance, the comparative example 2 had only a slight difference in comparison with the comparative example 1, and the comparative example 3 was good at an initial time of the drive, however was recognized a performance reduction in an early stage.

What is claimed is:

1. A pneumatic tire comprising a pair of bead portions, side wall portions extending to an outer side in a tire diametrical direction from the bead portions, and a tread portion connected to an outer end in a tire diametrical direction of each of the side wall portions,
    wherein an outer wall surface of the side wall portions is provided with a circumferential projection annularly extending along a tire circumferential direction, and a plurality of diametrical projections extending to an inner side in a tire diametrical direction from, and in abutting contact with, the circumferential projection and arranged so as to be spaced in the tire circumferential direction, and a gap portion formed between circumferentially adjacent diametrical projections is open to an inner side in the tire diametrical direction,
    wherein the outer wall surface is smooth between circumferentially adjacent diametrical projections, and
    wherein the diametrical projections have a plurality of projection heights and are coupled to the circumferential projection so as to substantially adjust a projection height from the inner side in the tire diametrical direction.

2. The pneumatic tire according to claim 1, wherein an upper end surface of the circumferential projection is positioned within a range between 20 and 40 mm from an outermost diameter position of the tire to an inner side in the tire diametrical direction.

3. The pneumatic tire according to claim 1, wherein a projection height of the circumferential projection is equal to or more than 5 mm.

4. The pneumatic tire according to claim 1, wherein a cross sectional shape in a cross section of a tire meridian of the circumferential projection is formed as a mountain shape having a flat upper end surface, and a contact length with the outer wall surface of the side wall portions is equal to or more than a projection height.

5. The pneumatic tire according to claim 1, wherein a distance in the tire circumferential direction of the diametrical projections is set to be equal to or less than a width of the diametrical projection.

6. The pneumatic tire according to claim 1, further comprising an auxiliary projection extending to an outer side in the tire diametrical direction from the circumferential projection.

7. A pneumatic tire comprising a pair of bead portions, side wall portions extending to an outer side in a tire diametrical direction from the bead portions, and a tread portion connected to an outer end in a tire diametrical direction of each of the side wall portions,
    wherein an outer wall surface of the side wall portions is provided with a circumferential projection annularly extending along a tire circumferential direction, and a plurality of diametrical projections extending to an inner side in a tire diametrical direction from, and in abutting contact with, the circumferential projection and arranged so as to be spaced in the tire circumferential direction, and a gap portion formed between circumferentially adjacent diametrical projections is open to an inner side in the tire diametrical direction,
    wherein the diametrical projections have a plurality of projection heights and are coupled to the circumferential projection so as to substantially adjust a projection height from the inner side in the tire diametrical direction, and
    wherein diametrical projections having the greatest projection height are the longest diametrical projections and have a projection height which is progressively reduced toward the inner side in the tire diametrical direction.

8. A pneumatic tire comprising a pair of bead portions, side wall portions extending to an outer side in a tire diametrical direction from the bead portions, and a tread portion connected to an outer end in a tire diametrical direction of each of the side wall portions,
    wherein an outer wall surface of the side wall portions is provided with a circumferential projection annularly extending along a tire circumferential direction, and a plurality of diametrical projections extending to an inner side in a tire diametrical direction from the circumferential projection and arranged so as to be spaced in the tire circumferential direction, and a gap portion formed between the diametrical projections is open to an inner side in the tire diametrical direction,
    wherein the outer wall surface is smooth between circumferentially adjacent diametrical projections, and
    wherein a distance in the tire circumferential direction between adjacent diametrical projections having different projection heights is set to be equal to or greater than the projection height of the shorter one of the adjacent diametrical projections.

* * * * *